United States Patent
Kelly et al.

(10) Patent No.: US 9,269,398 B2
(45) Date of Patent: Feb. 23, 2016

(54) CONTENT WITH NAVIGATION SUPPORT

(75) Inventors: Declan Patrick Kelly, Shanghai (CN);
Bei Wang, Shanghai (CN); Simon Blanchard, Shanghai (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 2222 days.

(21) Appl. No.: 13/513,622

(22) PCT Filed: Jun. 27, 2005

(86) PCT No.: PCT/IB2005/052124
§ 371 (c)(1),
(2), (4) Date: Jun. 4, 2012

(87) PCT Pub. No.: WO2006/008667
PCT Pub. Date: Jan. 26, 2006

(65) Prior Publication Data
US 2012/0281964 A1    Nov. 8, 2012

Related U.S. Application Data

(60) Provisional application No. 60/587,227, filed on Jul. 12, 2004.

(51) Int. Cl.
*H04N 9/80* (2006.01)
*G11B 27/10* (2006.01)
*G11B 27/034* (2006.01)

(52) U.S. Cl.
CPC ............ *G11B 27/105* (2013.01); *G11B 27/034* (2013.01); *G11B 2220/2562* (2013.01)

(58) Field of Classification Search
USPC .................................. 386/239–248
See application file for complete search history.

(56) References Cited

U.S. PATENT DOCUMENTS

| | | | | |
|---|---|---|---|---|
| 6,453,459 | B1* | 9/2002 | Brodersen et al. | 717/100 |
| 7,584,491 | B2* | 9/2009 | Bruckner et al. | 725/36 |
| 7,764,868 | B2* | 7/2010 | Okada et al. | 386/241 |
| 2002/0026521 | A1 | 2/2002 | Sharfman et al. | |
| 2002/0053078 | A1* | 5/2002 | Holtz et al. | 725/14 |
| 2003/0044171 | A1 | 3/2003 | Otsuka et al. | |

(Continued)

FOREIGN PATENT DOCUMENTS

| | | |
|---|---|---|
| EP | 1361759 A1 | 11/2003 |
| GB | 2366884 A | 3/2002 |

(Continued)

*Primary Examiner* — Hung Dang

(57) ABSTRACT

The invention is for player/recording systems for AN content such as DVD+RW, HDD, Blu-ray RE that record content from broadcast. To navigate through the content the player provides menus allowing the user can select content to watch. Passive content is replaced with active agents so that each piece of content will also contain a program part. The action by a user selecting a piece of content to play results in the program part being executed instead of the content being played. This program part displays menus that allow the user to navigate this particular piece of content, or alternatively, the program part may just start playing the AN content. Playing the actual content is under the control of the application. At the end of the content, the application decides the next action, such as displaying another menu. The application chooses when to exit the content (based on user action or end of content) and returns to the player menus. The invention provides more control for the content provider to control the appearance of their content.

23 Claims, 2 Drawing Sheets

(56) References Cited

U.S. PATENT DOCUMENTS

| | | |
|---|---|---|
| 2003/0161615 A1* | 8/2003 | Tsumagari et al. ............ 386/95 |
| 2004/0032348 A1* | 2/2004 | Lai et al. ........................ 341/50 |
| 2004/0126096 A1* | 7/2004 | Moon et al. .................... 386/95 |
| 2004/0175159 A1* | 9/2004 | Oetzel et al. ................. 386/125 |
| 2004/0189871 A1* | 9/2004 | Kurosawa et al. ............ 348/552 |
| 2005/0276567 A1 | 12/2005 | Okuyama et al. |

FOREIGN PATENT DOCUMENTS

| | | |
|---|---|---|
| JP | 2002369154 A | 12/2002 |
| JP | 2003244652 A | 8/2003 |
| JP | 2004053868 A | 2/2004 |
| JP | 2004055083 A | 2/2004 |
| JP | 2004186845 A | 7/2004 |
| WO | 0129660 A1 | 4/2001 |
| WO | 03017100 A1 | 2/2003 |
| WO | 03060699 A2 | 7/2003 |
| WO | 03077547 A1 | 9/2003 |
| WO | 03101087 A1 | 12/2003 |
| WO | 2004025452 A1 | 3/2004 |
| WO | WO 2004/025651 A1 * | 3/2004 |
| WO | 2004053858 A1 | 6/2004 |
| WO | 2004057608 A1 | 7/2004 |

* cited by examiner

CONTENT WITH NAVIGATION SUPPORT

The present invention relates to the playing and recording of audio/video content and, more particularly, to controlling applications to view content that run within digital systems.

Numerous currently existing systems are capable of recording A/V content. Many of these systems, such as DVD+RW, HDD, Blu-ray Disc RE, are configured to record content that is received from broadcast. In order to navigate through received content, the player/recorder typically provides a menu mechanism (such as a Table of Contents) that allows the user to select the piece of content to watch. The menus presented and the navigation through the content are generally implemented in the player so that content from different sources will be presented in the same manner on any particular player/recorder. A different player/recorder, such as a player/recorder from a different manufacturer, will present a different user interface (UI) to navigate the same content. Depending on the available meta-data, some navigation methods may not work for some pieces of content.

Published content (DVD for example) provide menus that allow the user navigate the content. These menus are contained within the content, such as being stored on a DVD disc. The menus contained in different pieces of content (such as different DVD discs) are presented to look the same when displayed on different player/recorders.

There are proposals that aim to associate a description of the content with the content itself, in a manner whereby the description could be provided as an application that can be run by the player/recorder. While these concepts provide advances, it is still desirable for the content to support its' own navigation directly rather than having to rely on a player application using content description to provide navigation. Therefore, providing a description of the content that allows a player/recorder to play the content does not address the shortcoming within the art of allowing the content to support its own navigation.

The invention addresses the need within the prior art by extending content with agents (agents as used herein refers to applications or computer programs) and possibly meta-data. It is envisioned by the invention that once the user selects to 'play' the content, instead of playing the content as in conventional systems, the system will execute an application. The application determines the specifics related to the presentation of the content. The application can present a menu to the user to let the user navigate through the content.

The recording system of the invention generates, for broadcast content, an agent (i.e. associates an application or program code with the content) when it records the content. This agent allows the user to navigate through this content. The agent can be based on a set of template applications wherein the system attaches a standard application to the content and creates a meta-data file (based on meta-data in the broadcast and locally generated meta-data). Once the user plays this recorded content the application is executed instead of playing the content.

The invention envisions that the user can modify the behavior of the application by running the application and interacting with it by choosing options presented to the user, thus allowing the user to customize the manner in which the content is navigated. Customization as envisioned can be done for the user's own content as well as broadcast content by adding a standard application, as described above, to a camcorder recording and providing the user with the ability to customize it. These customized applications can be shared, for example if the user shares content in a peer-to-peer network, the content agent would then be shared among members of the peer-to-peer network (i.e. the content plus the application and meta-data).

The invention can be used with an extended version of existing standards such Multimedia Home Platform (MHP) 1.0 to allow content to support its own navigation. The extensions require signaling techniques that indicate that the application can be only run from storage and to extend the signaling to indicate that the application should be started and the content not run. It is also envisioned that an option be provided for the application to reference the associated content call can be made to a Play API and reference the associated content instead of requiring a unique id or file name for the associated content. This makes it much easier to use a generic application. Additionally, the invention provides extensions for playing back MHP applications from storage. Allowing content to support its own navigation is a concept that can be configured as an extension to MHP for playback from storage case and such an extension would be very valuable to the content providers.

Figure 1:
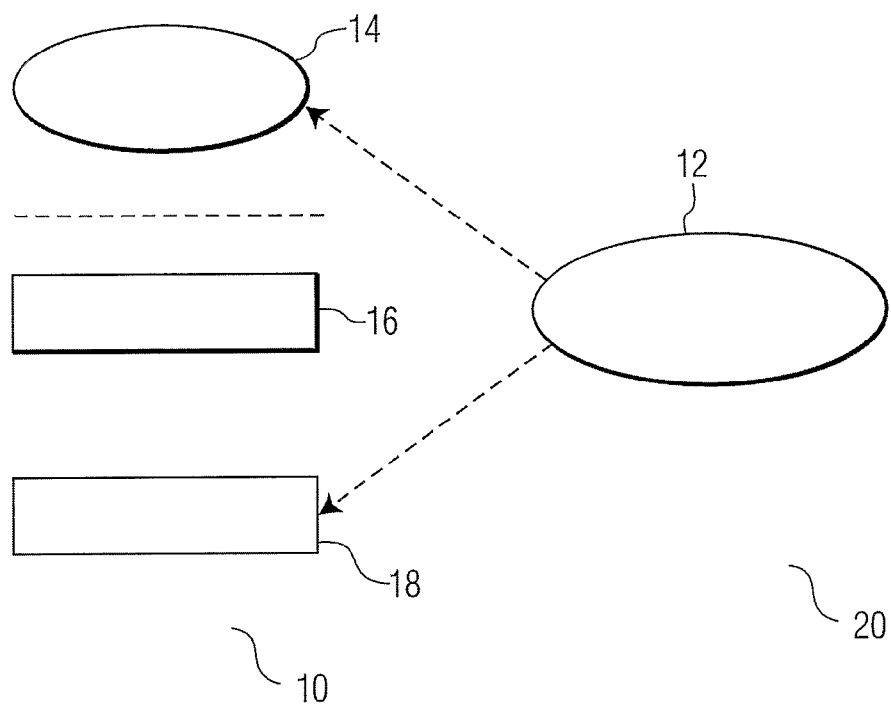
FIG. 1 is an illustration of a Player/recorder as envisioned by the invention.

The invention envisions replacing passive content with active agents. Essentially, each piece of content is configured to contain a program part. Normally a piece of content is a file (for example an MPEG-2 video file). Within the invention, the definition of a piece of content (referred to as an active agent) comprises three basic elements: (1) the actual content (e.g. the MPEG-2 video file); the (executable) application or program code; and a Meta-data File (optional). Once a user chooses to play a piece of content, the program part will be executed rather than the content being played. The program part, as envisioned, displays menus and allows user to navigate this particular piece of content. Alternatively, the program part may just start playing the A/V content. Playing the actual content is under the control of the application. Upon completion of the content, the application decides the next action to be taken, such as displaying another menu. Also, the application determines the point at which the content will be exited (based on user action or end of content) and returns to the player menus.

For example, when the user selects a movie, instead of starting to play the movie, the Content Agent presents a Chapter Menu (such as with DVD discs) so the user can select the chapter to watch. For another piece of content (e.g. documentary) the Content Agent could present forms of content navigation, such as a keyword search in the subtitles. As used herein, the 'content agent' comprises the Content, the Application and the Meta-data, upon user selection of a piece of content to be played, the Application is executed which controls playback of the A/V content.

The Content Agent as envisioned can be provided with the ability to store state information related to use of the player/recorder. The Application part is a computer program, accordingly, it can be provided with capabilities to store and read files on the local hard disk. The Application of the invention stores state information and also the application behavior is modified based on the stored information [jl1]the next time the user runs it. The Application as envisioned by the invention has the capability to read files that it, or a related application from the same source, has written. Storing state information allows the Content Agent to keep a history and so provide a tailored experience of the user. Conversely, the Content Agent can check player settings to tailor the playback to the current user, for example choosing a language based on player settings. It should be noted that the Content Agent relates to a particular piece of content, and not to a complete disc.

Content publishers of DVD/Blu-ray discs typically desire to provide the controls for the presentation of the content contained on the published discs. Once the content provided by the content publishers has been broadcast and recorded, the controls that were originally provided are commonly, no longer effective. The invention provides features that allow content publishers control of the presentation of their content, even in circumstances wherein recording of the content takes places after previous broadcasting or recording. To facilitate the inventive concepts, some changes are required to the iTV formats. The iTV system must allow applications that are only run from storage (i.e. only run after the content has been stored) and signaling to indicate this, it should also allow the applications to read/write file to local storage. The section below will describe the required solutions for the MHP case. This feature is an interesting idea for MHP, which aims to specify new signaling and methods to support playback of MHP content from storage.

The invention allows the content provider to control access to their content in a number of ways and to enhance the content dynamically:

Content provider defined menus are used to access the content;
Inserting new advertisements downloaded from the Internet;
Monitoring the user's opinion of content (with user agreement);
Intelligent resume of content;

The implementation of the invention comprises basic parts. Each piece of content includes of three parts:
A/V data
Meta-data
Application To support this model in general the player must support a Virtual Machine (VM) to execute the application. It is also possible that the application is native executable code for the player. FIG. 1 shows an example of how this might look.

FIG. 1 is an illustration of a Player Model 10 that is capable of operating the Content Object Structure 12 of the invention. The Application 14 is contained within the Content Object Structure 12 providing an executable program that can run on Virtual Machine 16 and can employ Meta-Data contained within Content Object Structure 12. The Playback Engine 18 handles rendering of the A/V content under control of the Application 14 that is defined by the Content Object Structure 12 as previously discussed. As envisioned by the invention, the user selects a piece of content to view from a menu, such as a Table of Contents. The Application 14 will start and the A/V content is played. In a typical scenario, the Application 14 will present a menu to the user (similar to a DVD chapter menu) allowing the user to navigate through the Content 20. Additionally, the Application 14 can present different playback options such as full version, director's cut, and highlights. One of the advantages provided by of the invention is that the content publisher can create different PlayLists that will generally be of expect higher quality than PlayLists generated by the player (such as automatic highlight generation).

The Player 10 preferably will support APIs to allow the Application 14 to start, stop or playback at certain points within the content (similar to JMF APIs in Java). Specifically the API should allow the application to refer to the associated content without needing to know the file name that the application was stored under. Two embodiments are envisioned, one in which the API supports a mechanism for indicating play associated content (e.g. Play API call with no content reference to indicate play associated content) or another embodiment in which the API supports a mechanism to ask for a reference to the associated content (e.g. filename) and then the regular Play API can be used. Also the Player 10 should support APIs to allow the application to display graphics on the screen, possibly overlaid on the video.

The Player 10 can preferably generate the Content Object Structure 12 provided within a broadcast stream. For example, if the broadcast stream includes A/V Data and some Meta-Data, the recorder can generate Application 14 that provides the user with the capability to navigate Content 20 based on the Meta-Data included within the Content Object Structure 12. Depending on the Meta-Data broadcast, Application 14 can have different features. One of the potential features that can be provided with Application 14 through Meta-Data, if the broadcast includes English subtitles (for English speaking users), Application 14 can offer a keyword search feature. Or course a keyword search of English subtitles could not be offered if the broadcast of Content 20 does not include English subtitles. It is envisioned that the Content Object Structure 12 containing A/V Data, Meta-Data and Application can be broadcast. The following description related to FIG. 2, describes an extension to MHP that could very well be included in future versions of MHP.

In a peer-to-peer network (e.g. ShareIt) users can share Content Objects, this makes sharing of content more interesting because the first user has the potential to customize the object to some extent e.g. by creating new user PlayList. If this approach is based on MHP extension then as long as each user has an MHP+Storage player they can exchange these active objects.

Figure 2:
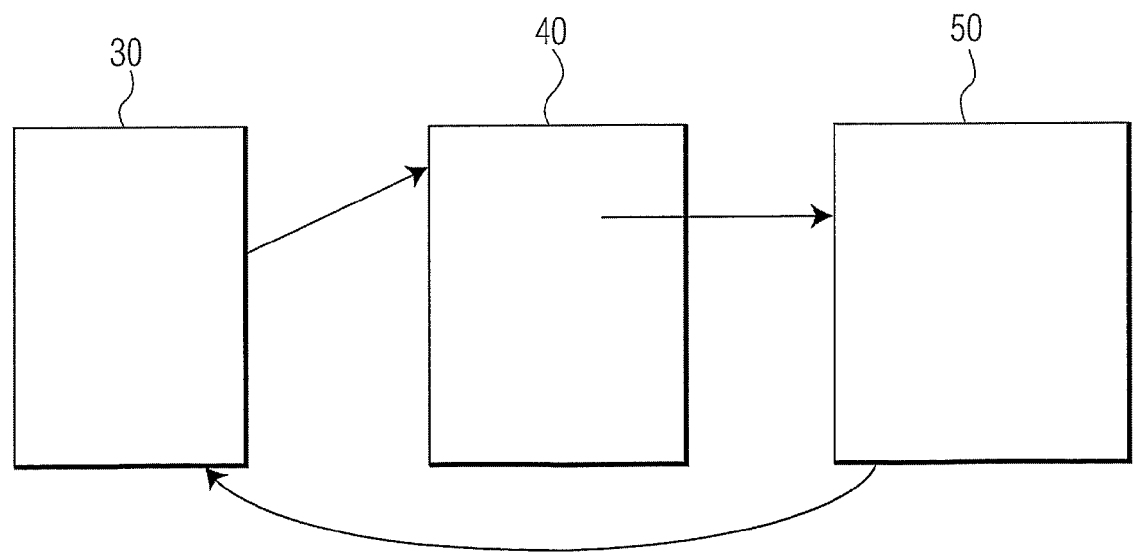
FIG. 2 is an illustration of the sequence of interactions within the method of the invention.

FIG. 2 illustrates an example of the sequence of interactions that could potentially occur in a system as proposed by the invention. As shown in FIG. 2, the sequence of interactions begins with the user selecting an entry from player menu for Table of Contents (TOC) 30. The selection on one of the TOC 30 entries activates the piece of content represented by that entry and the application program related to this content is started. Once started the content application displays a menu allowing the user to navigate through the content. In this example, the content application selected by the user is 'Friends'. The Friends Menu 40 is displayed and the user selects 'Play All' resulting in the content being played (started by the application). At the end of the content the application shows another Menu 50 (of course the application runs along side the content and so may overlay graphics/text/pictures on the content). Only when the user selects Exit does control pass back to the player menus.

MHP Specific Case

In the specific case for MHP, Content 20 is broadcast and Application 14 can be signaled to start/stop at certain times. The MHP standard, as it currently exits, does not cover running applications directly linked to content from storage. It is envisioned that future versions of MHP will allow the running of applications directly from storage, more specifically, the MHP standards currently being discussed address requirements that will provide for the running of applications directly from storage. To support running applications directly from storage, MHP requires the following extensions: (1) signaling that an application can only run from storage, and (2) signaling that the application should be started before A/V playback and will control playback of the A/V content. Typically, an Application Information Table (AIT), like that shown in Table 1 is used in MHP provide signaling of information to applications. The syntax of this table should be extended to reflect this new signaling. The application_control_code field could be extended to signal the following options:

Application should only be run from storage (so never during live broadcast);

Application should start without the content being played; the application is responsible for playing the content.

The second option is envisioned if the application is run from storage. As well as extending the AIT syntax for MHP, the following changes are envisioned to support this idea: support storage of APIs that allow the applications some control over A/V playback and to allow applications store/retrieve data files. In particular the application should have an API to play the associated content without knowing the file name. If JMF APIs are used to control playback then they should be extended to allow the application play the associated content without a content reference or to allow the application query a reference for the associated content.

A user without an MHP player with above discussed extensions can view the content simply by playing the content, however without the extra features of the invention. Accordingly, the features of the invention can be introduced without causing problems for the installed base of MHP systems.

TABLE 1

| Syntax | No. Of bits | Mnemonic |
|---|---|---|
| application_information_section( ){ | | |
| table_id | 8 | uimsbf |
| section_syntax_indicator | 1 | bslbf |
| Reserved_future_use | 1 | bslbf |
| Reserved | 2 | bslbf |
| section_length | 12 | uimsbf |
| application_type | 16 | uimsbf |
| Reserved | 2 | bslbf |
| version_number | 5 | uimsbf |
| current_next_indicator | 1 | bslbf |
| section_number | 8 | uimsbf |
| last_section_number | 8 | uimsbf |
| Reserved_future_use | 4 | bslbf |
| Common_descriptors_length | 12 | uimsbf |
| for (i=0; i<N; i++) { | | |
| descriptor( ) | | |
| } | | |
| Reserved_future_use | 4 | bslbf |
| application_loop_length | 12 | uimsbf |
| for(i=0;i<N;i++){ | | bslbf |
| application_identifier( ) | | |
| application_control_code | 8 | bslbf |
| reserved_future_use | 4 | uimsbf |
| application_descriptors_loop_length | 12 | |
| For(j=0;j<N;j++){ | | |
| descriptor( ) | | |
| } | | |
| } | | |
| CRC_32 | 32 | rpchof |
| } | | |

Figure 3:
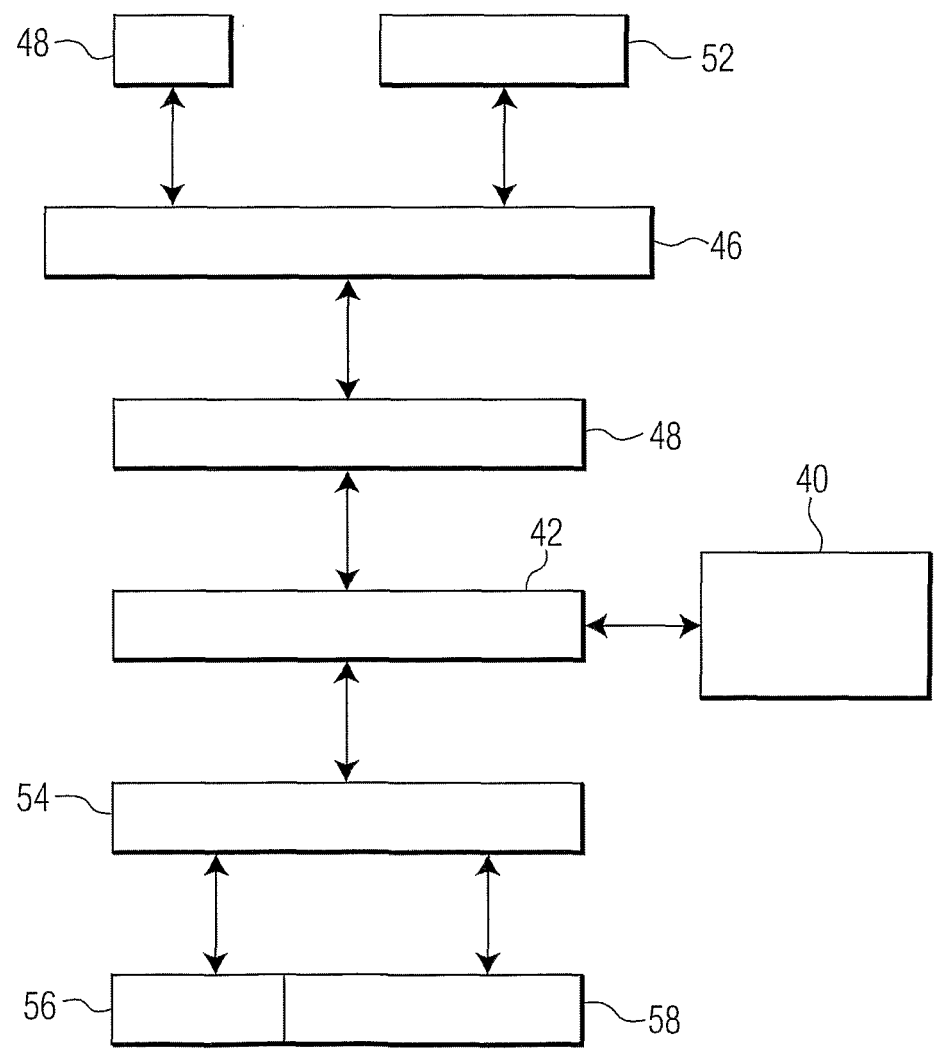
FIG. 3 is an illustration of an embodiment for the invention.

Referring to FIG. 3, which is an illustration of an embodiment for the invention based on the Java programming language showing a generalized implementation of a Java based platform 50. The uppermost layer contains one or more Java based applications 52 that can execute in parallel. The EPG 48 will run at this uppermost level and provide interactivity for the content that are navigated by the user. The system comprises multiple layers including a Java based Virtual Machine (VM) 48 that runs on an operating system 42 within the player/recorder. VM 48 will interface with the Applications 52, such as the EPG 48, through the Application Program Interface 46. The operating system 42 interfaces with drivers 54 that enable system access to the player/recorder hardware 58. An Application Manager 40 starts and stops applications and typically operates a navigator that can be employed by the invention to navigate through content that has been recorded in the HDD 56 within the system hardware 58. In the Java based embodiment as shown in FIG. 3, the player/recorder supports a Java VM 44 and the Content Agent is a Java application/applet that runs as an Application 52. Java does not contain most of the required elements for displaying video. Therefore, it is envisioned that Java media framework (JMF), or similar application program, be used with the Content Agent to display video. Is preferred that JMF be used with the Java components that do not need to access the operating system 42 in order to allow the Application 52 (which in the present case is the Content Agent) to display content. The object of not accessing operating system components is to provide the Content Agent that is a Java application/applet with the ability to control the appearance of the content when it is displayed, in accordance with the objects of the invention.

Still referring to FIG. 3, because MHP is constructed using the JAVA programming language, the player/recorder of FIG. 3 can be constructed in accordance with MHP. Having the player/recorder of FIG. 3 constructed using the MHP standard, the application part of the Content Agent will still be written in JAVA, however, in conformance with the MHP standard and the agent is then an MHP application. In this case the Content Agent can be included with in the broadcast or added to the recording later.

The foregoing description describes the most preferred embodiments known to the inventor for performing the invention. Various modifications will be obvious to those skilled in the art; accordingly, the scope of the invention should be measured by the appended claims.

The invention claimed is:

1. A method for providing an active application with an audio/visual content comprising:
    providing a content-comprising:
        said audio/visual content, a set of individually executable program parts and a corresponding meta data, wherein within each of the individually executable program parts is at least one menu;
    selecting said content;
    executing one of said set of individually executable program parts associated with said selected content, said executable program part:
        determining a corresponding meta-data in said content;
        incorporating said corresponding meta-data into said corresponding at least one menu, wherein a presentation of said corresponding at least one menu is altered by said incorporated corresponding meta-data;
        presenting said corresponding at least one menu, wherein said incorporated meta-data determines features associated with playing the corresponding audio-visual content; and
    presenting said corresponding audio/visual content under control of said executing one of said set of individually executable program parts, based on the selection of at least one of said incorporated meta-data in said presented at least one menu, wherein an appearance of said presented audio/visual content is controlled by the executing one of said individually executable program parts.

2. The method of claim 1, further comprising:
    returning to one of the at least one menu after presentation of said audio/visual content.

3. The method of claim 1, further comprising:
    presenting said audio/visual content under control of said executing one of the set of program parts.

4. The method of claim 3, wherein the presenting of said audio/visual content further comprises:
executing one of the set of program parts in response to a selection from the presented at least one menu.

5. The method of claim 1, wherein selection of an item from the presented at least one menu allows user navigation through said audio/visual content represented by the item on the at least one menu.

6. The method of claim 1, wherein providing said set of program parts further comprises:
an active agent that provides said content as an application.

7. The method of claim 1, wherein said content further comprises:
an active agent, the active agent further comprises an application having navigable attributes.

8. The method of claim 1, further comprising:
each of the program parts creating an application that allows modification of a behavior of the application.

9. The method of claim 8, wherein the application further comprises a content agent that provides a chapter selection.

10. The method of claim 9, wherein the content agent allows user definition of chapters.

11. The method of claim 9, wherein the content agent allows user definition of play lists.

12. The method of claim 1, further comprising:
broadcasting an application with said audio/visual content, and
signaling that the application should only be run if the audio/visual content has been stored.

13. The method of claim 1, further comprising:
signaling the program parts to start before said audio/visual content is played.

14. The method of claim 1, further comprising:
providing a content agent that links to an Internet site and downloads new advertisements.

15. The method of claim 1, further comprising:
providing a content agent that links to an Internet site and records user opinion of said audio/visual content.

16. The method of claim 1, further comprising:
providing a content agent that stores state information related to user viewing habits.

17. The method of claim 1 wherein the application can control said audio/visual content without having an explicit reference to the audio/visual content.

18. The method of claim 17 further comprising:
a reference indicating that the application is referring to the audio/visual content.

19. The method of claim 17 further comprising:
the application being capable of requesting a reference to the audio/visual content that can be used to control presentation of said audio/visual content.

20. A system for recording audio/visual content comprising:
a recorder recording an audio/visual content received by a recording system;
a plurality of template applications, each of the plurality of template applications being based on a type of said audio/visual content;
wherein the recorder:
associates each piece of audio/visual content received with one of the template applications,
generates an active application and an associated meta data associated with said audio/visual content, wherein said meta-data when incorporated into said corresponding at least one template application alters said at least one template application and a presentation of the at least one template application, including said incorporated meta-data, determines features associated with, and the appearance of, the corresponding audio-visual content, and
records, as a unit, said audio/visual content, said active application and said meta data.

21. The system for recording audio/visual content as in claim 20, wherein the recorder further comprises:
input means for receiving said audio/visual content.

22. The system for recording audio/visual content as in claim 20, wherein the recorder further associates each piece of audio/visual content with one of the template applications based on meta data contained in said audio/visual content.

23. The system for recording audio/visual content as in claim 20, wherein each of the active applications generated is an executable program.

* * * * *